US005855093A

United States Patent [19]

Medebach

[11] Patent Number: 5,855,093

[45] Date of Patent: Jan. 5, 1999

[54] CABLE-DRIVEN WINDOW LIFT

[75] Inventor: Thomas Medebach, Wetzler-Dudenhofen, Germany

[73] Assignee: Kuster & Co., Germany

[21] Appl. No.: 925,493

[22] Filed: Sep. 8, 1997

Related U.S. Application Data

[63] Continuation of Ser. No. 569,094, filed as PCT/EP94/02141, Jun. 30, 1994, abandoned.

[30] Foreign Application Priority Data

Jun. 30, 1993 [DE] Germany .......................... 43 21 735.4

[51] Int. Cl.[6] .............................. E05F 11/48; F16C 1/10; F16C 1/22

[52] U.S. Cl. ........................... 49/352; 74/502.4; 74/502.6

[58] Field of Search .................... 49/352, 375; 74/502.4, 74/502.6, 502.5, 500.5; 403/384, 394, 397; 464/52, 53

[56] References Cited

U.S. PATENT DOCUMENTS

| | | | |
|---|---|---|---|
| 3,444,649 | 5/1969 | Rivolier . | |
| 4,095,483 | 6/1978 | Sargeant | 74/502.4 |
| 4,379,536 | 4/1983 | Mizuno et al. | 403/397 |
| 4,395,053 | 7/1983 | Kalfas | 403/395 |
| 4,452,097 | 6/1984 | Sunkel . | |
| 4,685,350 | 8/1987 | Bauer et al. | 74/502.4 |
| 4,727,681 | 3/1988 | Kinoshita et al. | 49/352 |
| 4,823,752 | 4/1989 | Uuskallio | 74/502.6 |
| 4,889,006 | 12/1989 | Kolinske et al. | 403/397 |
| 4,920,697 | 5/1990 | Vail et al. . | |
| 4,937,977 | 7/1990 | Gergoe et al. | 49/352 |
| 5,074,077 | 12/1991 | Toyashima et al. | 49/352 |
| 5,172,878 | 12/1992 | Lederman | 74/502.4 |
| 5,233,881 | 8/1993 | Sayen et al. | 74/502.6 |
| 5,435,202 | 7/1995 | Kitamura | 74/502.4 |

FOREIGN PATENT DOCUMENTS

| | | | |
|---|---|---|---|
| 213247 | 1/1961 | Austria | 49/352 |
| WO 91/16545 | 10/1991 | Austria | 74/502.6 |
| 491917 | 4/1953 | Canada | 49/352 |
| A-1199784 | 12/1959 | France . | |
| A-37 27 153 | 2/1989 | Germany . | |
| A-39 21 289 | 1/1991 | Germany . | |
| A-40 15 774 | 7/1991 | Germany . | |

*Primary Examiner*—Daniel P. Stodola
*Assistant Examiner*—Curtis Cohen
*Attorney, Agent, or Firm*—Longacre & White

[57] ABSTRACT

A cable-driven window lift for vehicles, in particular motor vehicles, and comprises a drive unit for the cable core (29) of the cable assembly (15), said cable core (29) being guided by deflecting means (16) over at least one substantially vertical path within which it is connected to an lifter (14) holding the window pane (9) preferably at its lower edge zone, the window pane (9) being guided by its side edges (10, 11) in guide rails (12, 13) respectively on the side of the vehicle and of the door. To achieve simple and accurate guidance of the pane at simplified design, the invention provides that the minimum of one lifter (14) shall move up-and-down with the cable core (29) in the absence of separate guides and that the deflection means (16) for the cable core (29) be mounted on the guide rails (12, 13) of the window pane (9).

12 Claims, 3 Drawing Sheets

14
15
29
30
19
24
20

41
40
39
40
42
29
32
36
38
36
32
29
37
33
35

41
42
40
40
L
29
32
36
29
32
29
35
33
36
35

CABLE-DRIVEN WINDOW LIFT

This is a continuation of of application Ser. No. 08/569,094, filed as PCT/EP94/02141 Jun. 30, 1994, which was abandoned upon the filing hereof.

BACKGROUND OF THE INVENTION

1. Field of the Invention

The invention concerns a window lift a cable-driven window lift for vehicles, in particular motor vehicles, comprising a drive unit for the cable core of the cable assembly and guided by deflection means over at least one substantially vertical path wherein it is connected to an actuator holding the window pane preferably at its lower edge zone, said window pane being guided by its side edges in guide rails mounted respectively on the vehicle and door sides.

2. Description of the Prior Art

A cable-driven window lift for motor vehicles is known from the German patent document 37 27 152 A1 which comprises a drive unit with two outputs for the cable which runs in endless manner as two mutually crossing loops. The cable is guided over four deflection rollers or rounded means mounted to the corner zones of two mutually-apart guide rails. Lifter plates for the window pane are guided in geometrically locking and sliding manner at the guide rails and are driven themselves by the cable system displacing the window pane. The pane itself is guided by its end edges in further guides present in the door, for instance in the manner disclosed in the German patent document 39 21 289 C1. The known window lifts suffer from the drawbacks of complex design and foremost of excessively rigorous specifications for the pane guidance because the guides for the window lift or for the lifters and the pane guides must be exactly matched to each other.

OBJECT OF THE INVENTION

In the light of this state of the art, it is the object of the present invention to further develop the window lifts of the initially stated kind that simple and accurate pane guidance of a simplified design shall be achieved.

SUMMARY OF THE INVENTION

Essentially the invention solves this problem in that a minimum of one lifter moves up-and-down together with the cable core and in that the cable deflecting means are mounted to the guide rails of the window pane. As a result the invention makes it possible to eliminate the rails guiding the lifter(s) linked to the window pane and as a result excessively rigorous specification for the guidance system no longer is required.

Consequently a more advantageous drive torque is also achieved. Another advantage is that the noise generated in the known window lifts with lifter guide-rails having a stick-and-slip behavior [of said actuator] at the guide rail—which heretofore could be controlled only by complex and commensurately expensive rail coatings—will henceforth be eliminated. The elimination of the guide rails substantially decreases the hardware complexity of the window lift, the deflecting parts in the form of deflection rollers or rounded parts being affixable to the very guides of the window pane. Accordingly, the minimum of one actuator will be guided by the pane guide.

In a first and special embodiment of the invention, a minimum of one actuator portion is guided in a closed loop and held by a clamp on the lifter. This feature allows easy adjustment between the window pane and the lifter to be affixed to the cable.

The invention achieves especially simple clamping in that the minimum of one lifter comprises a preferably planar base element with a clearance to receive the cable-connecting clamp. As a result the lifter portion can be affixed to the cable core without need for a tool.

Very advantageously the clamp should comprise detent beaks gripping from behind, and in clamping manner, the base element in the area of the clearance, resulting in improved handling.

In a further conception of the invention, the clamp comprises a chamber receiving a fastener rigidly attached to the cable and further comprises cable passages at the chamber's end faces. The mutual attachment of cable and lifter base element is carried out in that the cable, by means of its retaining element, for instance in the form of a nipple, shall be guided like a loop through the clearance, whereupon the retaining element shall be placed into the clamp's chamber and next the clamp shall be pressed onto the clearance of the base element. Thereby the cable core is rigidly joined to the lifter in rigid manner and the connection between the window pane and the drive will have been established.

To facilitate the assembly of the window lift, an adjustment system for the cable length of the cable system is provided and comprises a spacer insertable at a separation site of the sheath of the cable system. As a result the cable may evince initially some slack to allow it to pass over the deflection means. The [said] slack is eliminated following assembly by a spacer inserted into the separation site of the cable core.

The invention provides an adjustment system comprising a base body crossed by a borehole to pass the cable and an longitudinal slot to insert the spacer between the separation-site end faces of the cable assembly. Insertion of the spacer between the end faces of the cable assembly is thereby made much easier.

Handling is further facilitated in that the base-body borehole comprise a stop for the cable sheath, preferably in the vicinity of the longitudinal slot, so that this sheath can be more easily pulled out of said zone.

The spacer may be attached to the base body in especially simple manner in that it is kept clamped against the base body, for instance by detents and their mating means, a result of which the spacer can be inserted without tools.

The invention moreover provides that the spacer shall peripherally grip the base body by means of arcuate wall extensions and that said spacer shall be secured against axial shifting preferably between two rest shoulders formed in the base body. In any event such a design precludes undesired loosening of the spacer from the base body.

In a further concept of the invention, the spacer comprises a longitudinal-boss extension with a longitudinal channel to receive the cable core, the end faces of said extension forming a stop for the ends of the cable sheath in the vicinity of the separation site. Thereby the adjustment system will be affixed in an especially stable manner.

Lastly the invention provides that the base body and/or the spacer of the adjustment system and/or the clamp be made of plastic.

Further objects, advantages, features and applications of the present invention follow from the description below of an illustrative embodiment and in relation to the drawings. All described features and/or features shown in graphic form are objects of the present invention, whether considered individually or in arbitrary combinations, also regardless of being combined in the claims or how the claims relate to one another.

DETAILED DESCRIPTION OF THE INVENTION

Figure 1:
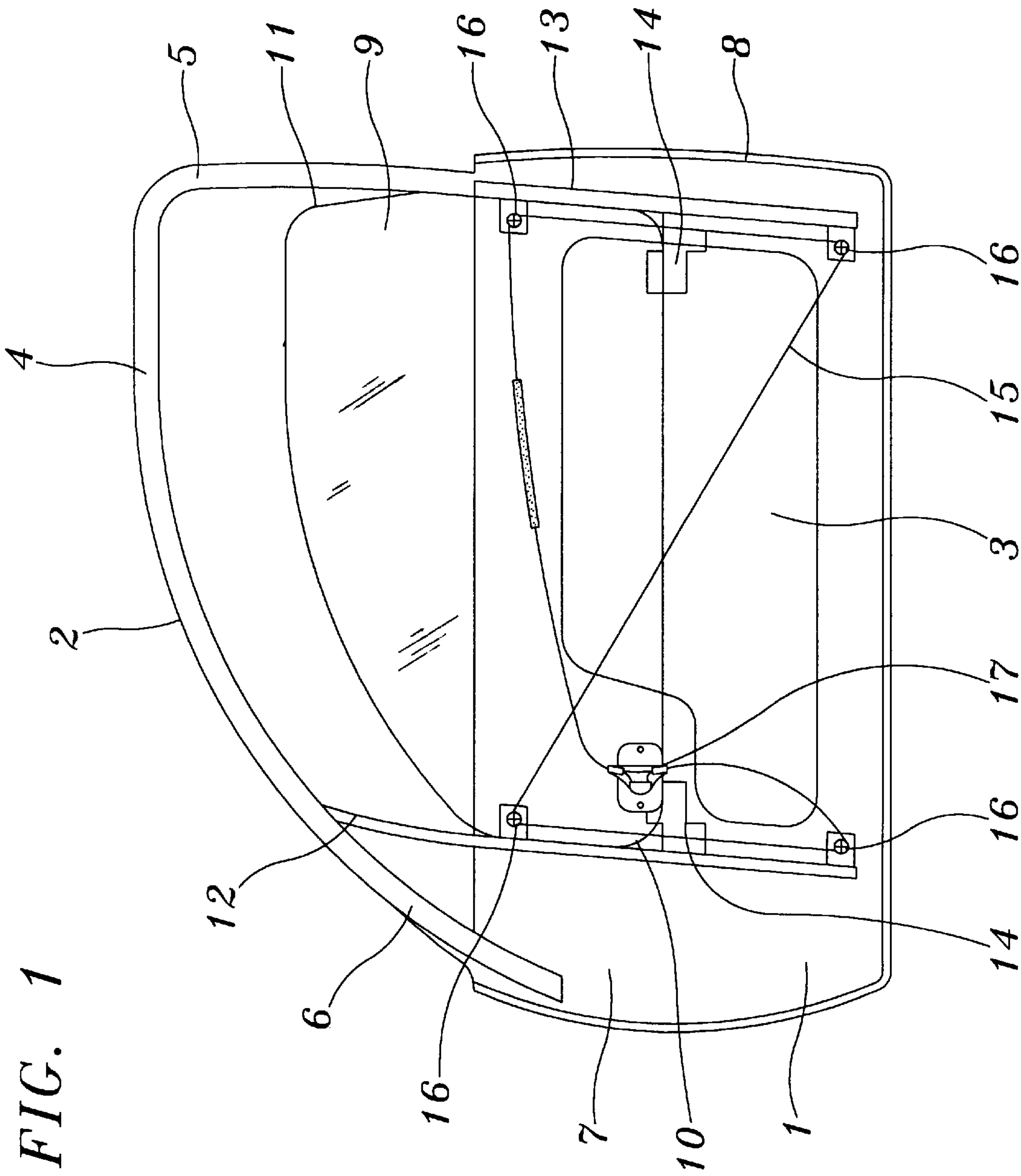
FIG. 1 is an elevation of the inside of a motor-vehicle door with a conceivable embodiment of a window lift.

The vehicle door shown in FIG. 1 comprises a lower door box 1 and an upper window frame 2. On its outside, the door box 1 is closed by an outer door skin 3 while as a rule being covered on the inside with door inside paneling. The door inside paneling was removed as shown in FIG. 1, whereby the window lift mounted in the door box can be seen. The window frame 2 comprises an upper frame portion 4, a rear frame portion S and a front frame portion 6. The shown door is typically affixed by its front side 7 by means of an omitted hinge to a retaining post of the vehicle, whereas the rear side 8 comprises an omitted door-lock component.

The window frame 2 receives a window pane 9 matching its peripheral contour and which, in FIG. 1, is shown half open. The window pane 9 is guided at its front edge 10 and at its rear edge 11 respectively in a front and rear guide rail 12 and 13. In the preferred embodiment, an lifter 14 is clamped to the lower end zone of each corner and the cable-core 29 of a cable assembly 15 is attached to said lifter. The cable assembly 15 is guided over four deflection means in the form of deflection rollers 16 affixed inside the door box 1 to the upper and lower ends of the two guide rails 12 and 13. The cable assembly 15 is guided in crossing manner over the deflection rollers 16 and runs toward an omitted shaft 17 of an omitted window crank or an electric drive. Depending on the direction of rotation of the shaft 17, the cable core 29 will be pulled in one direction or the other, whereby the lifters 14 displace the window pane 9 up or down.

As shown in FIG. 1, the lifters 14 can be moved up and down by the cable core 29 without separate guides. The lifters 14 are guided solely by means of the window pane 9, that is by this pane's guide rails 12 and 13. As a result excessive specifications regarding pane guidance are avoided.

Figure 2:
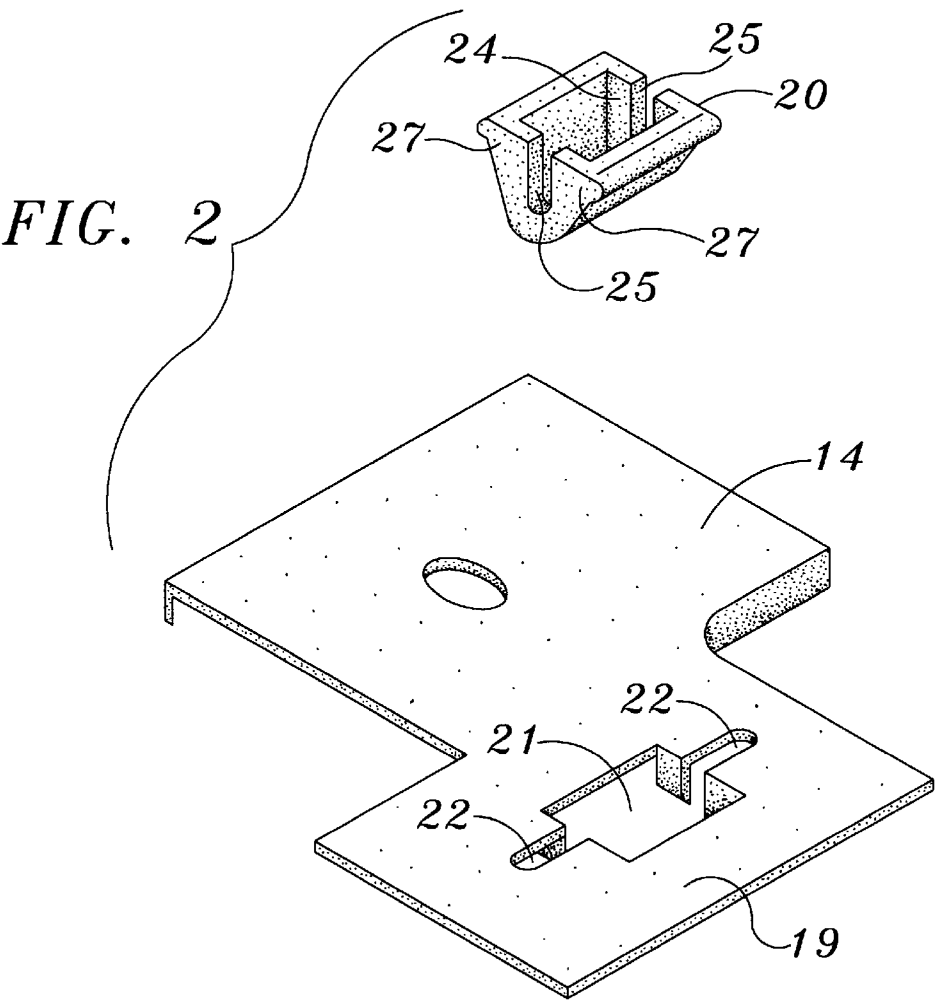
FIG. 2 is an elevated perspective view of an embodiment of the base element of the lifter with the clamp.
Figure 3:
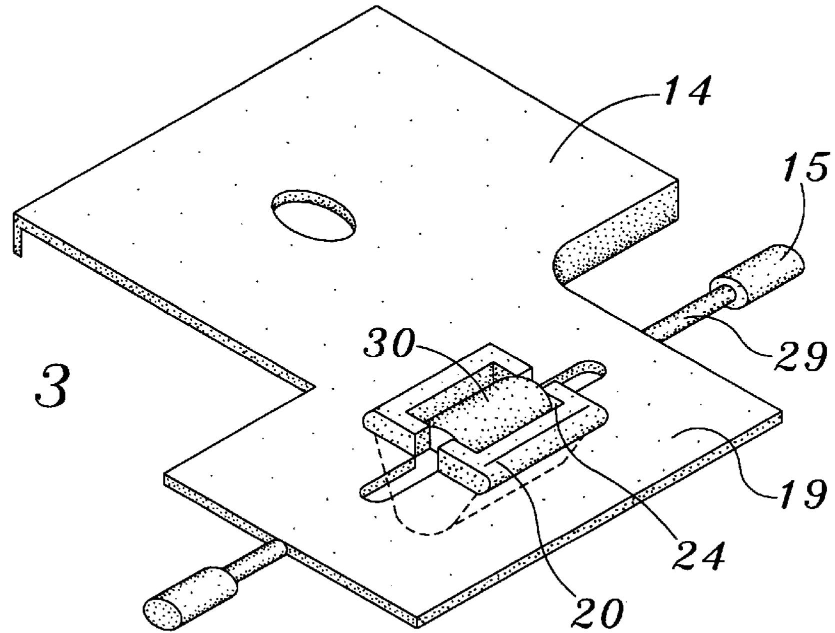
FIG. 3 is an elevated perspective view of the base element and clamp as shown in FIG. 2 in the assembled position.

FIGS. 2 and 3 show how to affix such an lifter 14 to the cable assembly 29. The lifter 14 is fitted with a planar base element 19 comprising an omitted seat for the window pane 9. The planar base element 19 comprises a clearance 21 wherein a clamp 20 in the form of a clip may be fastened. Illustratively such fastening is implemented by detent beaks 27 at the clamp 20.

The clamp 20 comprises a chamber 24 receiving a retaining element 30 rigidly joined to the cable core 29. This retaining element 30 assumes the form of a nipple and preferably is made of metal and it is crimped in immovable manner onto the cable core 29. The connection between the cable core 29 and the window pane 9 is implemented in that the cable core 29 together with the nipple 30 as shown for the planar base element 19 of FIGS. 2 and 3 is made to pass from below in the manner of a loop through the clearance 21 of the base element 19. Next the nipple 30 is placed in the chamber 24 of the clamp 20, the cable segments running each side of the nipple 30 being thereby located in the passages 25 of the end faces of the clamp 20. Then the clamp 20 is pressed into the clearance 21 of the base element 19, the said cable portions on each side of the nipple 30 being made to pass through the slots 22 present in the base element 19, without thereby damaging the cable core 29. As a result the cable core 29 is linked to the lifter so it cannot move relative to it and thereby also the window pane 9 is fixed relative to the drive of the window lift.

Figure 4:
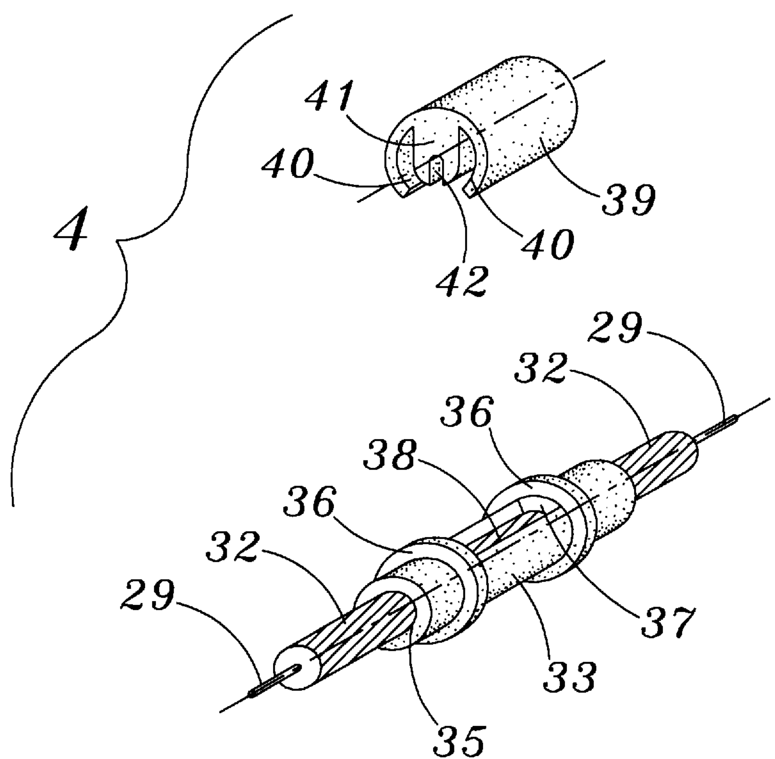
FIG. 4 is a perspective view of an alternate embodiment of an adjustment system of the claimed invention to adjust the cable length, together with the base body and the spacer.
Figure 5:
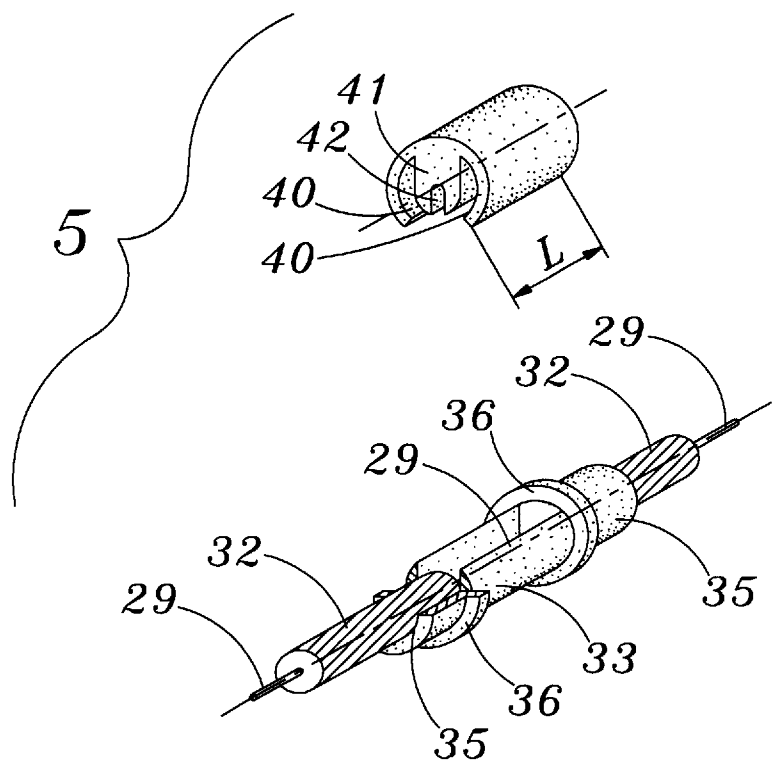
FIG. 5 is a partially cut away perspective view of the base body and spacer of FIG. 4.

To facilitate window lift assembly, the cable core 29 initially will offer some slack so that it may be easily looped around the deflection rollers 16. However, after the cable core 29 has been mounted, the slack must be removed to assure proper operation. To make possible such additional adjustment regarding the length of the cable assembly 15 or of the cable core 29, a cable-length adjustment system is inserted into the cable assembly 15 as shown by FIGS. 4 and 5. For that purpose the sheath of the cable assembly 15 is interrupted and a base body 33 is inserted between the two ends of the sheath 32. The base body 33 comprises a borehole 35 for the cable assembly 15 with a longitudinal slot 38 to insert a spacer 39 between the end faces of the sheath 32 that are formed by the separation of said sheath.

In the state shown in FIG. 4, the cable core 29 is of such length that it can easily be placed over the deflection rollers 16. In that state of assembly, the sheath 32 of the cable assembly 15 is inserted in the longitudinal slot 38 of the base body 33 and rests against the stop 37 of the borehole 35. In order to tension the cable core 29 when in this position, the portion of the sheath 32 resting in the longitudinal slot 38 is pulled out and only the cable core 29 shall remain in the manner schematically indicated in FIG. 5. Next the spacer 39 is inserted in such manner between the two rest shoulders 36 and onto the base body 39 that the cable core 29 will rest in the longitudinal channel 42 formed in a longitudinal boss 41 of the spacer 39. The wall projections 40 of the plastic spacer 39 resiliently give way during insertion and ultimately will peripherally enclose the retraction formed by the rest shoulders 36 at the base body 33, essentially being flush with the rest shoulders 36. Thereby, the spacer 39 is prevented from accidentally detaching from the base body 33.

To implement length adjustment, it is also possible to use spacers 39 of different lengths L to compensate for additional tolerances. In this procedure the spacer 39 is kept by the cable tension, and by the entailed compression against its end face, in an axial rest position against the rest 36 of the base body 37.

I claim:

1. A window lift for vehicles, in particular motor vehicles, comprising: a drive unit for a cable core (29) of a cable assembly (15) guided by deflection means (16) over at least one substantially vertical path, wherein, said cable assembly being connected to an actuator (14) holding a window pane (9) preferably at a lower edge zone, said window pane (9) having side edges (10, 11) being guided in a pair of guide rails (12, 13) for respective attachment to a vehicle and door sides, wherein, said actuator (14) moves up and down with said cable core (29) in the absence of separate guides and in that said deflection means (16) for said cable core (29) is mounted on said guide rails (12, 13) for the window pane (9) and wherein an adjusting system for the length of said cable assembly (15) is provided and comprises a spacer (39) insertable into a separation site of a sheath (32) of said cable assembly (15).

2. Window lift defined in claim 1, wherein the adjustment system comprises a base body (33) with a continuous borehole (35) for said cable assembly (15) and with a longitudinal slot (38) to insert into it said spacer (39) between a pair of separation-formed end faces of said sheath (32) of said cable assembly (15).

3. Window lift defined in claim 2, wherein the borehole (35) comprises a rest (37) for the sheath (32) of the cable assembly (15), said rest (37) preferably being situated in the vicinity of said longitudinal slot (38).

4. Window lift defined in claim 2, wherein said spacer (39) is clamped into said base body (33).

5. Window lift defined in claim 2, wherein said spacer (39) peripherally grips said base body (33) by means of a plurality of arcuate wall extensions (40) and is secured thereto between two rest shoulders (36) formed at said base body (33) to prevent axial shifting.

6. Window lift defined in claim 2, wherein one of the following of; said base body (33), and said adjustment spacer (39), said clamp (20) is made of plastic.

7. Window lift defined in claim 1, wherein a borehole (35) comprises a rest (37) for said sheath (32) of said cable assembly (15), said rest (37) preferably being situated in the vicinity of a longitudinal slot (38) of said adjustment system.

8. Window lift defined in claim 7, wherein said spacer (39) is clamped into said base body (33).

9. Window lift defined in claim 1, wherein the spacer (39) comprises: a longitudinal boss (41) having ends faces with a longitudinal channel (42) receiving said cable core (29), said end faces of the boss (41) forming a stop for the ends of said sheath (32) of said cable assembly (15).

10. A device to attach a cable to an actuator; said device comprising;

a retaining element rigidly attached to said cable;

a planar base element having a first and second side, said planar base element having an aperture extending from said first to said second side;

a clamp having a chamber adapted to receive said retaining element, said chamber having a pair of and faces each having a passage adapted to allow said cable to pass therethrough, said clamp further including detent beaks to prevent said clamp from passing completely through said aperture of said planar base element, said base element having a pair of slots extending from opposite sides of said aperture and aligned with said passages to allow said retaining element and a portion of said cable to pass through said aperture to facilitate assembly of said device, wherein, said clamp is disposed within said aperture whereby said chamber is at least partially disposed on said first side of said planar base element and said detent beaks are disposed on said second side of said planar base element, said retaining element is disposed within said chamber thereby preventing longitudinal translation of said retaining element with respect to said clamp, said cable extending through said passages of said end faces adjacent said aperture on said first side of said planar base element thereby preventing displacement of said clamp with respect to said planar base element, whereby when tension is applied to said cable said cable prevents said clamp from dislodging from said aperture thereby providing a secure attachment of said cable and said clamp to said planar base element.

11. A method of assembling the device according to claim 10, said method comprising the steps of:

inserting said retaining element and a portion of said cable through said aperture from said first side to said second side;

inserting said retaining element into said chamber of said clamp such that said cable extends through said passages;

inserting said clamp into said aperture of said planar base element such that said chamber is at least partially disposed on said first side of said planar, said cable is disposed on said first side of said planar base element and said detent beaks are disposed adjacent said second side of said planar base element;

applying tension to said cable to prevent said clamp from dislodging from said aperture thereby providing a secure attachment of said cable and said clamp to said planar base element.

12. A cable driven window lift for vehicles comprising:

a drive unit for a cable core (29) of a cable assembly (15) and guided by deflection means (16) over at least one substantially vertical path, wherein said cable assembly is connected to at lease one actuator (14) holding a window pane (9), said window pane (9) having side edges (10, 11) being guided in a pair of guide rails (12,13) for respective attachment to a vehicle and door sides, wherein the at least one actuator (14) moves up and down with said cable core (29) in the absence of separate guides and said deflection means (16) for said cable core (29) is mounted on said guide rails (12, 13) for the window pane (9);

said cable core includes a retaining element rigidly attached thereto;

said actuator comprises a planar base element having a first and second side, said planar base element having an aperture extending from said first to said second side; and a clamp having a chamber adapted to receive said retaining element, said chamber having a pair of end faces each having a passage adapted to allow said cable to pass therethrough, said clamp further including detent beaks to prevent said clamp from passing through said aperture of said planar base element, said base element having a pair of slots extending from opposite sides of said aperture and aligned with said passages to allow said retaining element and a portion of said cable to pass through said aperture to facilitate assembly of said device, wherein, said clamp is disposed within said aperture whereby said chamber is at least partially disposed on said first side of said planar base element and said detent beaks are disposed on said second side of said planar base element, said retaining element is disposed within said chamber thereby preventing longitudinal translation of said retaining element with respect to said clamp, said cable extending through said passages of said end faces adjacent said aperture on said first side of said planar base element thereby preventing displacement of said clamp with respect to said planar base element, whereby when tension is applied to said cable, said cable prevents said clamp from dislodging from said aperture thereby providing a secure attachment of said cable and said clamp to said planar base element.

* * * * *